United States Patent [19]

Andersson et al.

[11] 4,122,674
[45] Oct. 31, 1978

[54] APPARATUS FOR SUPPRESSING COMBUSTION NOISE WITHIN GAS TURBINE ENGINES

[75] Inventors: Anders O. Andersson, Seattle; Robert B. Purves, Kent, both of Wash.

[73] Assignee: The Boeing Company, Seattle, Wash.

[21] Appl. No.: 754,584

[22] Filed: Dec. 27, 1976

[51] Int. Cl.² .............................................. F02C 7/24
[52] U.S. Cl. ............................ 60/39.65; 60/39.69 R; 431/114
[58] Field of Search ........................... 60/39.65, 39.69; 431/114

[56] References Cited

U.S. PATENT DOCUMENTS

| | | | |
|---|---|---|---|
| 2,657,531 | 11/1953 | Pierce | 60/39.65 |
| 2,664,702 | 1/1954 | Lloyd et al. | 60/39.65 |
| 2,933,895 | 4/1960 | Cheeseman | 60/39.69 |

*Primary Examiner*—Robert E. Garrett

*Attorney, Agent, or Firm*—Christensen, O'Connor, Johnson & Kindness

[57] ABSTRACT

A burner can, including a noise suppressing cavity, for use in the combustor assembly of a gas turbine engine to minimize the combustion noise emitted by the engine, is disclosed. The cavity is mounted at an end of the burner can that includes a fuel nozzle for injection of fuel into the interior of the burner can and is in acoustic communication with the interior of the burner can via a perforated metal sheet that forms a partition between the burner can and the cavity. The cavity is dimensioned and arranged in view of the acoustic transmission system formed by the burner can and the duct system that interconnects the burner can with the engine turbine stage to exhibit an acoustic impedance which minimizes the propagation of combustion noise from the burner can through the engine turbine stages to thereby reduce the engine noise level.

7 Claims, 9 Drawing Figures

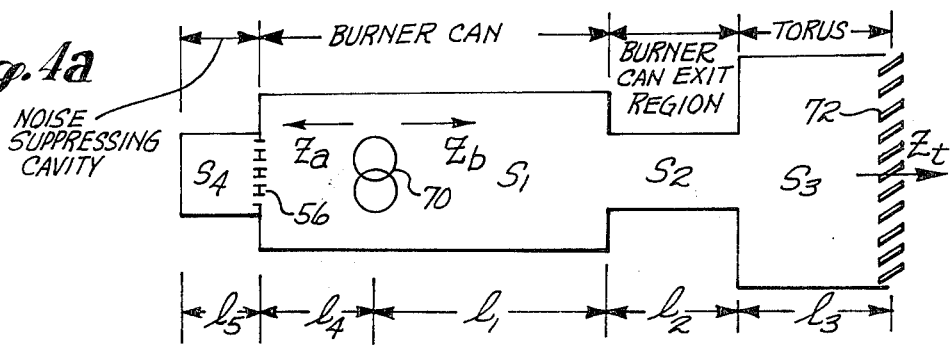
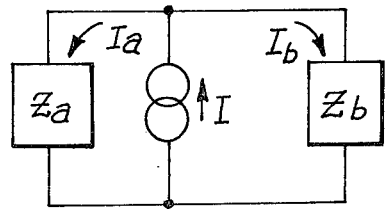
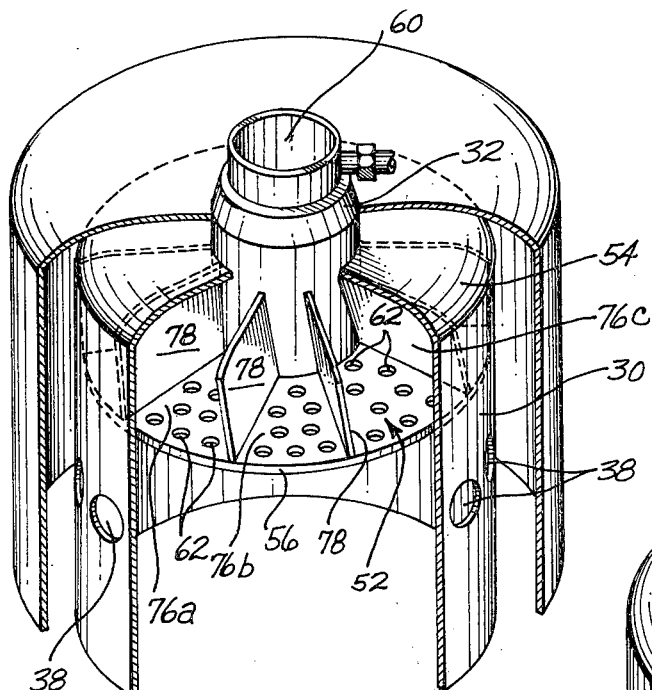
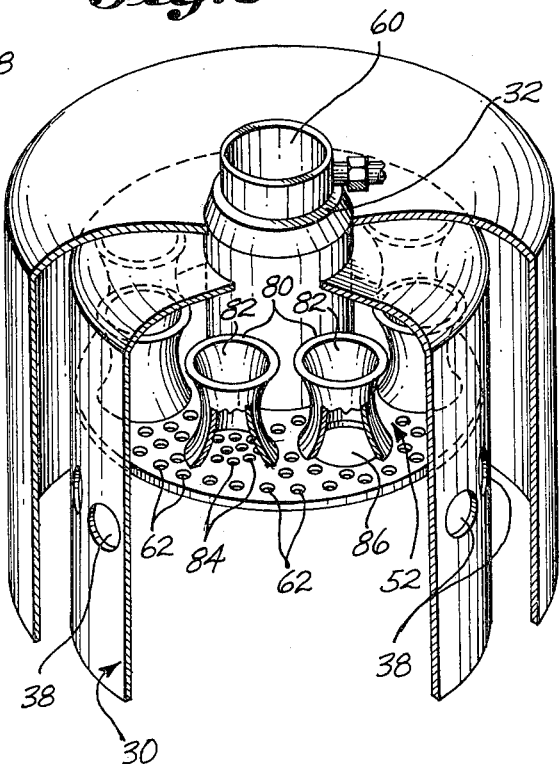

APPARATUS FOR SUPPRESSING COMBUSTION NOISE WITHIN GAS TURBINE ENGINES

BACKGROUND OF THE INVENTION

This invention relates to noise suppressing apparatus for gas turbine engines. More particularly, this invention relates to apparatus for reducing the combustion noise level of gas turbine engines.

The noise generated by a gas turbine engine comprises a number of noise components, each of which is generated by various noise sources within an operating gas turbine. For example, one major component of noise is caused by the rotating turbomachinery included within the compressor assembly, the turbine assembly and the fan assembly of a turbofan engine. A second major component of noise is the jet noise that is generated by the mixing of the turbine exhaust gases with the ambient air, while yet a third component of noise is the combustion noise that results from the burning of fuel within the gas turbine combustor assemblies.

Recent advances in the design of gas turbine engines have not only improved engine performance, but have also greatly reduced the overall engine noise level. Specifically, the development of the high bypass ratio turbofan engine has significantly reduced jet noise by reducing the mean jet velocity. Improved acoustic lining techniques and materials, utilized within the air inlet and passageways of recently designed gas turbine engines, have provided reductions in turbomachinery noise such as fan noise, compressor noise and turbine noise. Even with these advances in engine noise reduction, the noise emitted by gas turbine engines such as those employed on transport aircraft remains higher than desirable, with the result that governmental control is periodically effected to reduce the permissible noise level of new engine designs or even to restrict the use of currently operational engine designs. With the previously mentioned reductions in turbomachinery noise and jet noise, combustion noise, which was once considered to be a relatively minor noise source, has become important to the extent that further reduction of overall engine noise level generally requires a decrease in the generation of combustion noise.

Although the factors that influence the generation of combustion noise have not been totally analyzed and understood, it is known within the art that the frequency spectrum of aircraft engine combustion noise includes frequency components within the range of 100–1,000 Hz, with the frequency spectrum peaking generally between 200 and 600 Hz. Further, it is known that, although the primary source of the combustion noise is the combustion process, the structural configuration of the engine combustors or combustion chambers influences the magnitude of the combustion noise components.

Within the prior art, reductions in combustion noise have generally been effected by parametric tests in which combustor design parameters (e.g., the arrangement and configuration of the openings in the combustor wall that supply pressurized air from the compressor stage to the interior of the combustor) are varied. Other approaches to combustion noise reduction include muffler-like apparatus that is mounted downstream of the engine combustors, acoustic lining materials peripherally mounted around the combustor walls, and treatment of the combustor flame holder.

Although successful to some degree, none of the prior art attempts have proven totally satisfactory. Further, such attempts have often resulted in decreased engine performance and an increase in engine weight, or have resulted in a configuration that can only be employed within a new engine design.

Accordingly, it is an object of this invention to provide apparatus for reducing the level of combustion noise generated by a gas turbine engine.

It is another object of this invention to provide a low noise burner can assembly for use in a variety of gas turbine engines, It is yet another object of this invention to achieve the above-mentioned objects such that the invention can be utilized in either present engine designs or newly designed engines without a significant increase in engine weight or a significant loss in engine performance.

SUMMARY OF THE INVENTION

These and other objects are achieved in accordance with this invention by a combustor that includes a noise suppressing cavity that is mounted to one end of the combustor. The noise suppression cavity is generally annular in shape and often surrounds a fuel nozzle that injects fuel into the interior region of the combustor. The cavity is in acoustic communication with the interior of the combustor via a perforated plate that separates the cavity from the primary combustion zone of the combustor. In this arrangement, the noise generated in the primary combustion zone of the combustor travels substantially in two directions, propagating toward the cavity and also propagating along with the combustion products through the engine turbine stage and then through the engine exhaust outlet.

In accordance with this invention, the combustion noise energy traveling through the turbine and discharged into the surrounding environment is minimized by structuring the noise suppressing cavity such that the acoustic impedance of the cavity minimizes the acoustic resistance at a predetermined point or region within the interior of the combustor. More explicitly, in each embodiment of the invention, the combustor, the turbine stage, and the associated engine ducting that interconnects the combustor with the turbine stage, are considered as components of an acoustic transmission line and the cavity is structured to minimize the flow of acoustic noise energy through these components. Advantageously, it has been found that the noise suppressing combustor arrangement of this invention operates in combination with conventional gas turbine engines without substantially decreasing the engine performance. Since conventional gas turbine engines generally have adequate space available surrounding the fuel entrance region of a conventional combustor, the invention can generally be employed in existing engines as well as in new engine designs.

In one disclosed embodiment of the invention, the combustor or burner can of a reverse flow gas turbine engine, of the type commonly used as an auxiliary power unit on transport aircraft, is configured to include a noise suppressing cavity which is structured to minimize the combustion noise that propagates from the burner can through a toroidally-shaped duct and into the engine turbine stage via a fixed-area nozzle ring. In a second disclosed embodiment of the invention, a noise suppressing cavity is included on an annular burner arrangement for a gas turbine engine of the variety commonly utilized to propel jet aircraft. Additionally, various structural arrangements of noise suppressing cavities which can be utilized with various engine configurations to obtain an acoustic impedance that minimizes the combustion noise are disclosed. These disclosed cavities include cavities having radially partitioned interior regions, and cavities utilizing hyperbolic horn elements for coupling combustion noise energy into the cavity.

BRIEF DESCRIPTION OF THE DRAWINGS

FIGS. 4a and 4b are schematic diagrams respectively depicting a generalized acoustic transmission system and a simplified analogous electrical circuit that are useful in understanding the structure and operation of this invention;

FIGS. 5 and 6 are partially cut away isometric views of burner cans equipped with noise suppressing cavity arrangements that can be employed in the practice of this invention;

DETAILED DESCRIPTION

Figure 1:
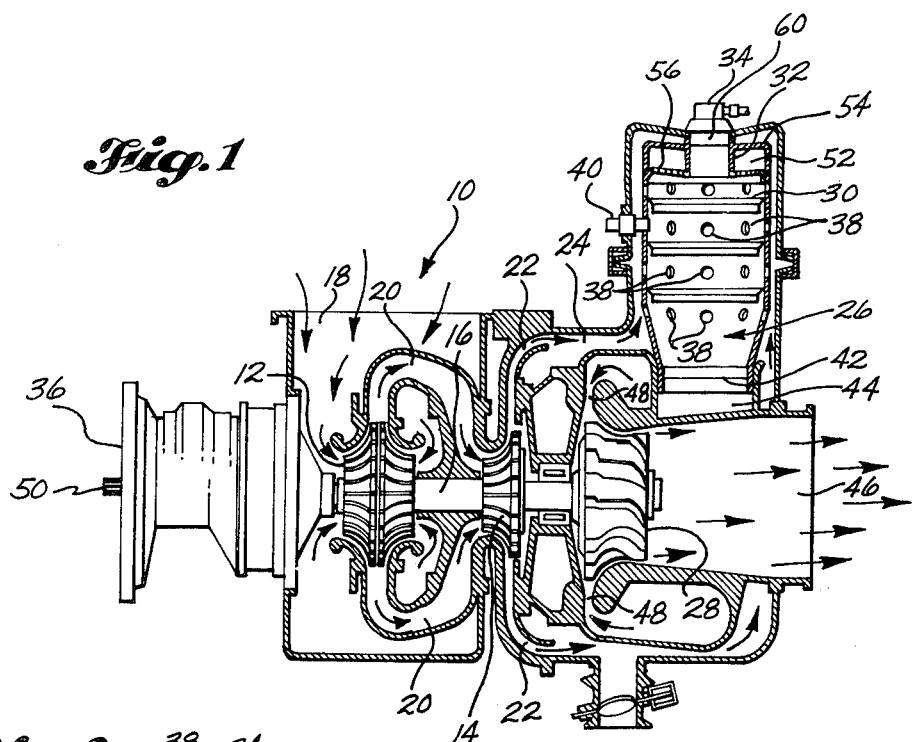
FIG. 1 is a cross-sectional view of a reverse flow gas turbine engine illustrating a burner can equipped with a noise suppressing cavity in accordance with this invention.

FIG. 1 depicts a burner can in accordance with this invention, utilized as a reverse-flow combustor within a type of gas turbine engine that is commonly employed as an auxiliary power unit on commercial jet transport aircraft. The gas turbine engine (generally denoted as 10) includes first and second spaced apart compressor stages 12 and 14 that are mounted to a shaft 16. As denoted by the arrows in FIG. 1, air enters a compressor inlet plenum 18, which surrounds the compressor stages 12 and 14, and is compressed by the first compressor stage 12. The compressed air flows through a crossover duct 20, through the second compressor stage 14, and into a vaned diffuser 22. The compressed air exiting the diffuser 22 is forced into a closed turbine plenum 24 which encases an engine combustor assembly 26 and an engine turbine assembly 28. The combustor assembly 26 includes a substantially cylindrical burner can 30 enclosed within an outwardly projecting cylindrical portion of the turbine plenum 24. The outward end of the burner can 30 includes a centrally mounted tubular section 32 that extends through the walls of the turbine plenum 24. A fuel nozzle 34, connected to a fuel pump that is located within a forward mounted accessory unit 36, interconnects with the tubular section 32 for injecting fuel into the burner can 30. Fuel, injected into the upper region or primary combustion zone of the burner can 30 by the nozzle 34, is mixed with high pressure air which flows from the turbine plenum 24 into the interior region of the burner can 30 through a series of openings 38 located in the wall of the burner can 30. The mixed fuel and air is ignited by an igniter 40, which projects through the walls of the turbine plenum 24 and the burner can 30.

The hot combustion gases that result from the ignition of the mixed fuel and air flow downwardly through a circular exit opening 24 in the lower end of the burner can 30 and into a torus 44, which coaxially surrounds the turbine assembly 28 and forms a circular exhaust duct 46 for the gas turbine engine 10. In particular, the forward edge of the torus 44 is arranged to form a fixed area nozzle ring 48 located along the forward edge of the turbine assembly 28. Hot combustion gases flowing from the opening 42 of the burner can 30 flow through the torus 44 and are directed across the turbine assembly 28 by the nozzle ring 48. As the hot gases flow past the turbine assembly 28 and are exited through a circular opening formed by the interior wall of the torus 44, the turbine assembly 28 is rotated, to, in turn, rotate the shaft 16 and the compressors 12 and 14. The forward end of the shaft 16 is connected to a gear 50 located on the forward face of the accessory unit 36 for providing shaft horsepower to equipment such as generators, alternators, pumps and compressors.

As is known in the art, a combustion process, such as that occurring within the primary combustion zone of the burner can 30, generally produces a considerable amount of noise. Although open flames generally exhibit a relatively flat frequency spectrum in the 50–1,000 Hz range, burner cans such as burner can 30 normally exhibit a noise spectrum having a relatively broad band peak in the 200–600 Hz range. In prior art arrangements, noise generated within the burner can flows through the burner can exit opening, through the torus 44 and turbine 28, and hence rearwardly through the exhaust duct 46. As shall be described in more detail hereinafter, in accordance with this invention the combustion noise generated within the burner can 30 is suppressed by an annular cavity 52, which is formed at the upper end of the burner can 30 and coaxially surrounds the tubular section 32.

In each embodiment of the invention, the annular cavity 52 is structurally arranged and dimensioned to exhibit an acoustic impedance which minimizes the flow of combustion noise energy through the gas turbine exhaust duct 46, and hence reduces combustion noise relative to that noise generated by prior art gas turbine engines. More explicitly, the acoustic impedance of the annular cavity 52 is established, in view of the acoustic impedance exhibited by the remaining portion of the burner can 30, the duct-like exit region 42 of the burner can 30, the torus 44, and the turbine assembly 28, to cause a significant portion of the noise energy to flow into the annular cavity 52 where the noise is suppressed.

Figure 2:
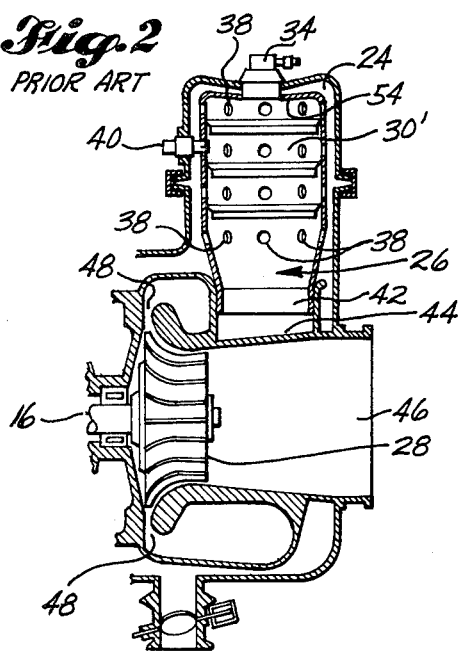
FIG. 2 is a partial cross-sectional view of the engine of FIG. 1 depicting a prior art burner can arrangement.
Figure 3:
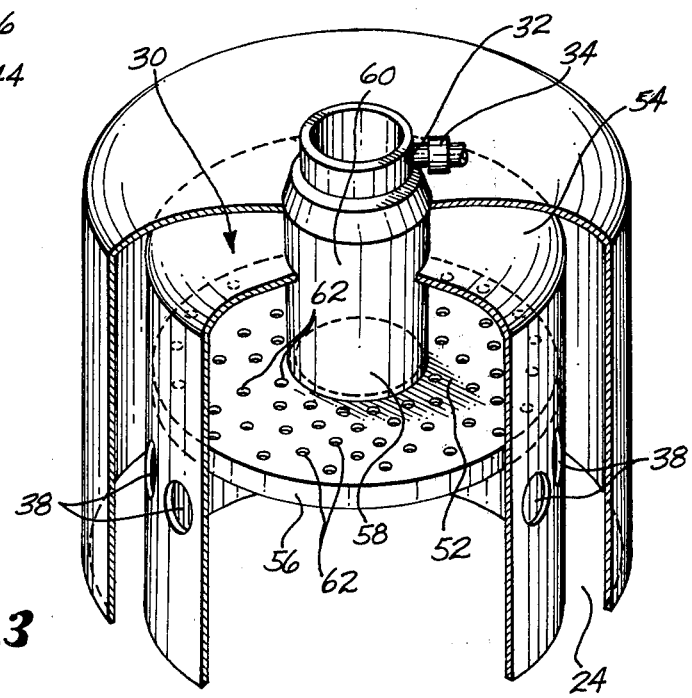
FIG. 3 is a partially cut away isometric view of the burner can and noise suppressing cavity of the engine arrangement of FIG. 1.

The basic structural differences between a burner can constructed in accordance with this invention and prior art burner cans can be ascertained by comparing the prior art burner can 30' of FIG. 2 with the burner can 30 of FIG. 1. As can be seen in FIGS. 1 and 2, the prior art burner can 30' and the burner can 30 of this invention each have the same general exterior geometry. Specifically, both the burner cans 30 and 30' are substantially cylindrical shells which extend from a closed upper end 54 to the circular exit opening 42 located at the lower end of the burner can. As previously described, a series of openings 38 admit compressed air into the burner can for mixing with the fuel that is injected through the fuel nozzle 34. Unlike the prior art burner can 30', the upper region of the burner can 30 does not include openings 38, but extends downwardly to form an imperforate outer boundary wall of the annular cavity 52. As is best shown in FIG. 3, the lower boundary wall of the cavity 52 is formed by a perforated annular disc 56, which extends transversely across the interior of the burner can 30 at a location just above the first series of openings 38. The central opening 58 of the annular disc 56 is of substantially the same diameter as the diameter of the tubular section 32, with the disc 56 being mounted to the lower end of the tubular section 32 so as to provide a centrally located closed passageway for accommodating the fuel nozzle 34. To prevent compressed air from entering directly into the annular cavity 52 or escaping from the turbine plenum 34, the fuel nozzle 34 forms an airtight seal with the upper boundary wall of the turbine plenum 24 and forms an airtight seal with the boundary wall 54 of the burner can 30.

The dimensioning of the annular cavity 52 and the arrangement and dimensioning of the openings or perforations 62 in the annular disc 56 can best be understood by examining the theoretical considerations that form the basis of operation of this invention. As shall be described hereinafter, the theoretical aspects of this invention involve considering the annular noise suppressing cavity 52, along with the remaining portions of the burner can 30 and the associated ducting to the turbine 28 (e.g., torus 44) as an acoustic transmission line, with the annular cavity 52 being structurally arranged to minimize the combustion noise energy that is transmitted through the turbine 28 and directed rearwardly through the gas turbine exhaust duct 46.

FIG. 4a depicts a generalized acoustic model of the combined burner can and ducting arrangement of the gas turbine engine of FIG. 1, that results by considering the acoustic system to be a series of acoustically hard-walled ducts or pipes that are excited by a single constant velocity source of sound energy. Specifically, in the model of FIG. 4a, the burner can 30 is represented by an acoustic transmission line having a circular cross-sectional area of $S_1$ and a length of $l_1 + l_4$, with a constant velocity acoustic sound source 70 being located a distance of $l_1$ from the exit orifice of the burner can 30. The burner can duct-like exit region 42 and the torus 44 are respectively modeled as acoustic transmission lines having circular cross-sectional areas of $S_2$ and $S_3$ with lengths $l_2$ and $l_3$. The face of the turbine assembly 24 (denoted by the numeral 72) is acoustically represented as an acoustic impedance $Z_t$. The cross-sectional area and the length of the annular cavity 52 are respectively denoted in FIG. 4a as $S_4$ and $l_5$, with the cavity 52 being acoustically coupled to the transmission line model of the burner can 30 by the acoustic resistance of the perforated annular ring 56.

In the acoustic model of FIG. 4a, and the derivation of the acoustic properties of the annular cavity 52, it is assumed that the burner can 30 is effectively a hard-walled duct, i.e., that no acoustic energy is coupled radially outward through the burner can openings 38. This assumption is justified in that the flow rate through the openings 38 from the turbine plenum 24 is relatively high, thus effectively preventing the outward propagation of sound energy through the burner can openings 38. Further, in the initial design of a cavity 52 of this invention, it is generally assumed that the constant velocity source 70 supplies a plane wave which propagates toward the annular cavity 52 and toward the turbine 24 in a unimodal manner.

As is known to those skilled in the art, the dimension $l_1$, which defines the position of the constant velocity source 70 within the transmission line section that represents the burner can 30, can be determined by experimental and/or theoretical techniques that are commonly utilized to model a complex sound source as an equivalent point source of acoustic energy. With respect to this invention, it has been determined that the distance, $l_1$, generally lies in the range of from 1 to 3 inches. Advantageously, such a dimension provides very satisfactory results because those noise sources closest to the noise suppressing cavity 52 appear to transfer acoustic energy through the engine ducting and exhaust orifice more efficiently than sources of noise energy located a greater distance from the noise-suppressing cavity 52.

Although the burner can 30, the duct-like burner can outlet 42, and the torus 44 do not physically correspond to circular acoustic transmission lines, such an approximation can be made by establishing the cross-sectional area and the length of each model element on the basis of the physical configuration of the corresponding portion of the engine arrangement. For example, although torus 44 of FIG. 1 is substantially an annular duct having a noncircular cross-sectional geometry, a representative uniform sectional area $S_3$ and length $l_3$ of an equivalent model element can be derived by theoretical and-/or experimental means. Alternatively, the torus 44 can be modeled as a tapered section of acoustic transmission line or as several sections of transmission line having different cross-sectional areas. To date, such refinements in the modeling of the torus 44 have not improved the performance of the resulting embodiments of this invention, and hence may not be necessary. Similarly, in most instances, the acoustic impedance represented by the turbine assembly 28 is not located at the turbine nozzle ring 48 of FIG. 1, but is effectively located a short distance from the turbine face. This location can be determined by either analytical and/or experimental means and is most advantageously included in the acoustic model of FIG. 4a by inclusion of this dimension within the length $l_3$ of the torus 44.

Referring to the acoustic model of FIG. 4a and recognizing that each section of transmission line (e.g., the model elements representing burner can 30, the duct-like exit region 42 of the burner can 30, and the torus 44, exhibit a characteristic impedance of the form $\rho\ c/S$ where $\rho$ is the density of the fluid medium, $c$ is the speed of sound within that medium, and S is the respective approximate cross-sectional area, it can be shown that when a boundary condition is applied, the instantaneous pressure generated by the source 70 and traveling toward the termination $Z_t$ is identical to the pressure generated by the source 70 and traveling toward the annular cavity 52. The acoustic impedance $Z_a$ presented to the constant velocity source 70 by the length of transmission line $l_4$ and the annular cavity 52 can be expressed as $Z_a = P_a/u_a$ with $$\begin{bmatrix} p_a \\ u_a \end{bmatrix} = \begin{bmatrix} \cos kl_4 & i \sin kl_4 \\ i \sin kl_4 & i \cos kl_4 \end{bmatrix} \begin{bmatrix} 1 & R_a \\ 0 & 1 \end{bmatrix} \begin{bmatrix} -i(S_3/S_4) \cot kl_5 \\ 1 \end{bmatrix} \quad (1)$$

where Equation (1) is expressed in two-dimensional matrix notation, wherein $p_a$ denotes the pressure wave generated by the source 70 that travels toward the annular cavity 52, $u_a$ denotes the local velocity within this wave, $k$ denotes the wavenumber $2\pi/\lambda$ where $\lambda$ is the wavelength of the sound energy, $R_a$ represents the acoustic sheet resistance of the perforated annular ring 56 (normalized in terms of $\rho c/S_1$), $i$ denotes the imaginary operator and cos, sin and cot respectively denote the cosine, sine, and cotangent of the indicated angular quantities. By further utilizing the above-described assumptions and analytic techniques, it can be shown that the impedance $Z_b$ presented to the source 70 by the length of line $l_1$ of the burner can 30 and the transmission line model elements corresponding to the duct-like exit region 42 of the burner can 30, torus 44, and turbine 28 can be expressed as $Z_b = P_b/u_b$ with $$\begin{bmatrix} P_b \\ u_b \end{bmatrix} = \begin{bmatrix} \cos kl_1 & i \sin kl_1 \\ i \sin kl_1 & \cos kl_1 \end{bmatrix} \begin{bmatrix} S_1/S_2 & 0 \\ 0 & 1 \end{bmatrix} \quad (2)$$

$$\begin{bmatrix} \cos kl_2 & i \sin kl_2 \\ i \sin kl_2 & \cos lk_2 \end{bmatrix} \begin{bmatrix} S_2/S_3 & 0 \\ 0 & 1 \end{bmatrix}$$

$$\begin{bmatrix} \cos kl_3 & i \sin kl_3 \\ i \sin kl_3 & \cos kl_3 \end{bmatrix} \begin{bmatrix} Z_t \\ 1 \end{bmatrix}$$

where $p_b$ is a pressure wave generated by the source 70 that travels toward the turbine 24 and $u_b$ is the particle velocity within this pressure wave.

Utilizing Equations (1) and (2) along with the well known technique of converting an acoustic system into an analogous electrical system for purposes of ready analysis, it can be recognized that the lumped-circuit analogy of FIG. 4b substantially represents the acoustic model of FIG. 4a. Since the circuit of FIG. 4b comprises a constant current source 74 having two parallel connected load circuits $Z_a$ and $Z_b$, it can be seen that the total load impedance presented to the current source 74 is $Z = Z_a Z_b/(Z_a + Z_b)$. Since the current $I_b$, flowing through impedance $Z_b$ is equal to $IZ/Z_b$, wherein I is the total current supplied by the current source 74, it can be seen that the power dissipated in the impedance $Z_b$ is approximately $$P_b = Re\,[Z_b]\,|I_b|^2 = Re\,[Z_b]\left|\frac{IZ_a}{Z_a + Z_b}\right|^2 \quad (3)$$

where $Re[Z_b]$ denotes the real part of the complex impedance $Z_b$ and the vertical lines denote the magnitude of the current $I_b$.

Since the power $P_b$ corresponds to the acoustic energy passed through the turbine impedance 72 of the acoustic model of FIG. 4a, the power $P_b$ is approximately proportional to the far field noise generated by the gas turbine engine represented by the model of FIG. 4a. By examining Equation (3), it can be recognized that the combustion noise generated by a burner can, such as burner can 30, can be minimized by suitably controlling the acoustic impedance of the annular cavity 52 to minimize, over a band of frequencies, the acoustic impedance $Z_a$ presented to the equivalent noise source (i.e., source 70 of the acoustic model of FIG. 4a). Specifically, since each parameter of the impedance $Z_b$ (Equation (2)) is established by physical parameters of the fluid flow path through the gas turbine engine, the depth and volume of the annular cavity 52 and the configuration of the openings through the perforated annular ring 56 are controlled in accordance with this invention to effect an impedance $Z_a$, which minimizes the far field noise passing from the turbine exhaust duct 46.

In view of the above-described operation of the invention, it will be recognized by those skilled in the art that various structural variations can be utilized in the noise suppressing cavity 52 to minimize the equivalent acoustic impedance at $Z_a$ of the corresponding acoustic model, e.g., the acoustic model of FIG. 4a which corresponds to the engine arrangement depicted in FIG. 1. In this respect, FIGS. 5 and 6 depict structural variations which may be employed within the noise suppressing cavity 52 to advantageously control the impedance $Z_a$ of FIG. 4a. In particular, in the embodiment depicted in FIG. 5, the noise suppressing cavity 52 is subdivided or partitioned into a plurality of separate cavities 76 by radially extending partitions 78. The radial partitions 78 are angularly disposed or canted relative to the axial center line of the burner can 30 and extend from the tubular section 32 to the interior surface of the walls of the burner can 30. In the axial direction, the partitions 78 extend from the inner surface of the upper end face 54 of the burner can 30 to the uppermost surface of the annular disc 56. The partitions 78 can be spaced at equal angles and be equally canted relative to a vertical reference line to tune each of the cavities 76 to the same frequency, or alternatively, the partitions 78 can be unequally spaced and form various angles with a vertical reference line to separately tune various cavities 76 to different frequencies and hence provide sound attenuation over somewhat broader frequency range. In any case, the canted arrangement of the partitions 78 effectively decreases the depth of the annular cavity 52 necessary to suppress a particular frequency component of the noise energy. That is, an annular cavity 52 arranged in accordance with FIG. 5 will exhibit noise suppression over a lower frequency range than an equal depth noise suppressing cavity arranged as illustrated in FIG. 3.

In the arrangement of the burner can 30 depicted in FIG. 6, hyperbolic horns 80 are utilized to couple the sound energy into the annular noise suppressing cavity 52. Each horn 80 is a tubular section having a central passageway 82 that first converges in cross-sectional area such that a cross section of a horn 80 defines a hyperbolic curve. Generally the horns 80 extend upwardly from the annular disc 56 and are equally spaced about the annular disc 56. As is shown in FIG. 6, sound energy can be coupled into the hyperbolic horns 80 by a plurality of small openings 84 similar to the perforations 62 of the embodiments depicted in FIGS. 3 and 5, or alternatively the sound energy can be coupled into the hyperbolic horns 82 by a single, circular opening 86 of a dimension substantially equal to the circular opening of the hyperbolic horns 80. In any case, a noise suppressing cavity 52 utilizing hyperbolic horns 80 provides an acoustic impedance, i.e., the acoustic impedance $Z_a$ of FIG. 4a, that effectively suppresses noise energy at frequencies lower than a cavity 52 that does not utilize the hyperbolic horns 80. That is, the hyperbolic horns 80 reduce the depth dimension of the annular noise suppressing cavity 52 necessary to suppress noise at a particular frequency.

Figure 7:
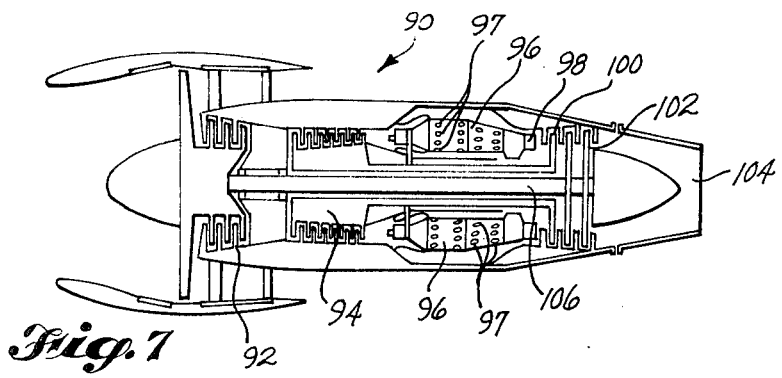
FIG. 7 is a cross-sectional side elevation view of an aircraft gas turbine engine equipped with a combustor having noise suppressing cavities structured in accordance with this invention.

FIG. 7 depicts a second type of gas turbine engine which can advantageously employ the present invention. In FIG. 7, a gas turbine engine of the type utilized to propel conventional aircraft, (generally denoted by the numeral 90), includes a bladed fan assembly 92, an axial compressor 94, a combustor stage 96, a low pressure turbine stage 100, and a low pressure turbine stage 102. As is known in the art, air flowing through the engine 90 is compressed by the fan stage 92 and the axial compressor 94, with a portion of the airflow being ducted into the combustor stage 96. The combustor stage 96 either includes a plurality of generally cylindrical burner cans that are annularly arranged around the axial center line of the engine 90 or includes two spaced apart, substantially cylindrical walls forming an annular chamber. Air is mixed with fuel within each of the burner cans (or, equivalently in the annular chamber) and ignited, whereupon rapid expansion of the fuel occurs and a high velocity stream of combustion products exits the combustor 96 to rotate the blades of the high pressure turbine 100 and the low pressure turbine 102. Rotation of the low and high pressure turbine stages rotates the blades of the axial compressor 94 and the fan assembly 92 through a concentric shaft arrangement 106. The gas stream exiting the low pressure turbine stage 102 is expelled through an exhaust nozzle 104 to provide thrust.

In prior art gas turbine engines of the type depicted in FIG. 7, combustor walls generally include a plurality of air openings 97 dimensioned and arranged for permitting pressurized air to flow into the interior of the combustor. As in the case of the prior art burner can 30' depicted in FIG. 2, the upstream end of each burner can generally forms an imperforate end face having a central opening for the injection of fuel.

Figure 8:
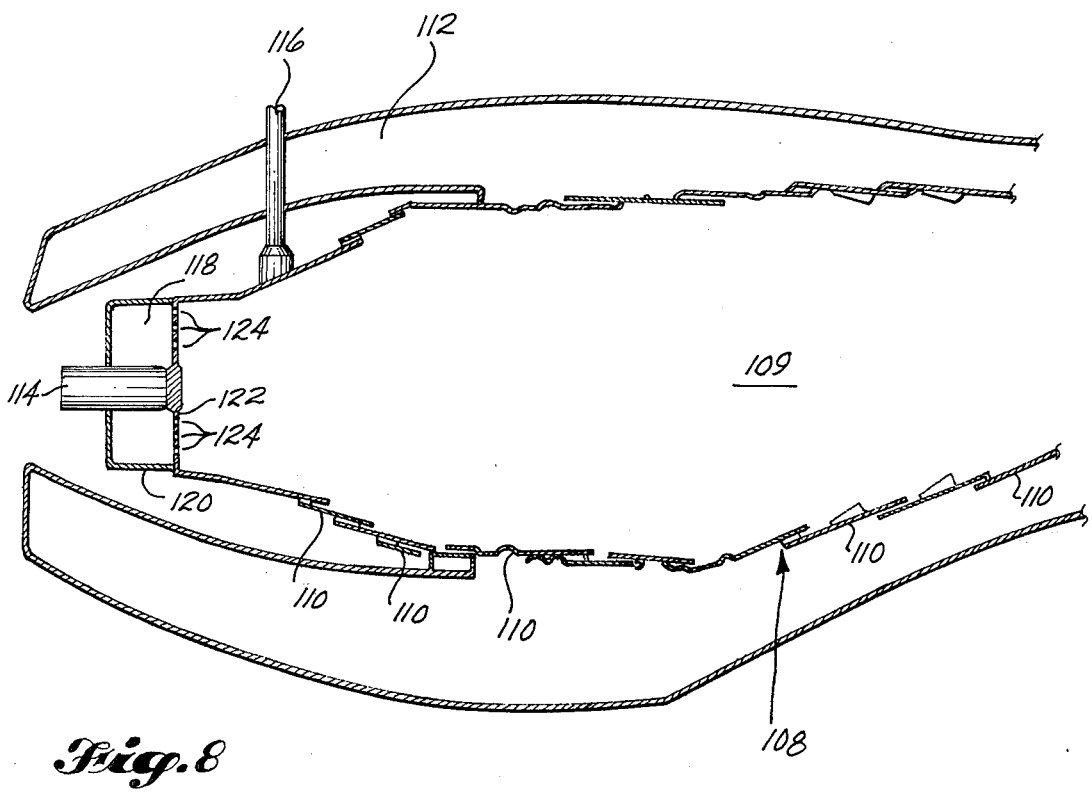
FIG. 8 is a cross-sectional view of a burner and noise suppressing cavity of the engine arrangement depicted in FIG. 7.

Referring to FIG. 8, which depicts a burner 108 configured in accordance with this invention for use in a gas turbine engine such as the engine of FIG. 7. It should be noted that burner 108 can be either the previously referred to annular arrangement of cylindrical burner cans or the previously referred to annular combustor. It should also be noted that the interior region or combustion chamber 109 of the burner 108 is configured substantially identical to prior art arrangements. Specifically, the walls of the burner 108 can are formed by an overlapping arrangement of annular rings 110, which are joined together in a manner which admits cooling air along the wall surfaces of the burner. Additionally, as depicted in FIG. 7, the wall surfaces of the burner 108 include a plurality of openings 97 arranged and dimensioned to admit the inflow of air supplied by the compressor stage 94. For example, as shown in FIG. 8, the burner 108 is effectively surrounded by an axial duct 112 which causes the compressed air to flow along the boundaries of the burner can 108. As in the case of the burner can 30 of FIG. 1, a fuel nozzle 114 injects fuel into the combustion region 109 of the burner 108, with the fuel being ignited by an igniter 116 that extends radially inward into the burner.

Similar to the previously described burner can arrangement of this invention, the practice of this invention relative to the burner 108 of FIG. 8 includes an annular noise suppressing cavity 118 surrounding the fuel nozzle 114. More explicitly, in this embodiment of the invention, the annular cavity 118 is formed by a generally cup shaped imperforate wall 120 which is joined to the upstream end of the burner 108. As in the previously described embodiments, the annular noise suppressing cavity 118 is in acoustical communication with the combustion chamber 108 of the burner can by means of an annular disc 122 which includes perforations or openings 124.

Viewing the embodiment of the invention depicted in FIG. 8 and the engine arrangement of FIG. 7, it can be realized by those skilled in the art that the acoustic arrangement effected by the burner 108; the duct 98, which directs the combustion products exiting the combustor to the engine turbine stages; and the turbine stages 101 and 102 can be represented by an acoustic transmission line model similar to the acoustic model of FIG. 4a. Accordingly, in each embodiment of the arrangement of the invention depicted in FIGS. 7 and 8, the noise suppressing cavity 118 is configured to minimize the acoustic impedance presented to a source of plane waves, i.e., a constant velocity source located within a predetermined region of the burner. As previously described, determination of the distance between the annular ring 122 and such an equivalent noise source can be determined on a theoretical and/or experimental basis. Further, as previously described, various structural variations can be included within the noise suppression cavity 118, such as those embodiments depicted in FIGS. 5 and 6, to provide the most optimal decrease in combustion noise emitted through the exhaust nozzle 104 of FIG. 7.

What is claimed is:

1. In a gas turbine combustor apparatus including at least one burner having wall means defining an end face and an oppositely disposed substantially open end wherein fuel is injected into the interior region formed by said wall means by a fuel nozzle adapted for mounting within a central opening of said burner end face, said fuel being ignited within said interior region of said burner to supply a flow of gaseous combustion products through said open end of said burner, the improvement comprising:

a noise suppressing cavity for reducing the combustion noise generated by the ignition of said fuel within said burner, said noise suppressing cavity including an annular disc transversely disposed across said interior region of said burner and a tubular section for the injection of said fuel into said interior region of said burner, said tubular section extending from said central opening of said burner end face to the central opening within said annular disc, said tubular section passing through said central opening of said burner end face with the outer periphery of said tubular section being connected to the boundary of said central opening of said burner end face to prevent the passage of fluid flow between said outer periphery of said tubular section and said boundary of said central opening in said burner end face, said annular disc having a plurality of openings therein for placing said noise suppressing cavity in acoustic communication with said interior region of said burner, said openings of said annular disc and said noise suppressing cavity being dimensioned and arranged to effect a minimum acoustic impedance relative to a theoretical constant velocity acoustic source positioned within a predetermined region of said interior region of said burner, said burner wall means being imperforate in the region extending from said burner end face to said transversely disposed annular disc.

2. The improvement of claim 1, wherein said noise suppressing cavity further includes portion means for subdividing said annular cavity into a plurality of separate cavities, said partition means extending radially from the outer surface of said tubular section to the inner surface of said burner wall means, said partition means extending axially between the inner surface of said burner end face and a surface of said annular disc, said partitions being angularly disposed relative to the axial center line of said tubular section.

3. The improvement of claim 1, wherein said noise suppressing cavity further includes a plurality of acoustic horns, each of said horns being tubular and having a substantially hyperbolic cross-sectional geometry, said horns being mounted in circumferentially spaced relationship on one surface of said annular disc to extend inwardly into said interior region of said noise supressing cavity.

4. A low noise burner can for use as a combustor within gas turbine engine, wherein fuel is ignited within said combustor to the combustion products formed by the ignition of said fuel is exited to a duct assembly for rotating a turbine stage of said engine, said burner can comprising:

wall means defining a substantially cylindrical shell that is substantially symmetrical about an axial center line, said substantially cylindrical shell having a first closed end and a second oppositely disposed end, with first and second ends being substantially perpendicular to said axial center line, the central portion of said closed end of said shell including fuel injection means for accommodating the injection of said fuel into the interior region of said shell, said fuel injection means passing through said closed end of said shell and extending inwardly into said interior region of said cylindrical shell with said fuel injection means being affixed and sealed to said closed end of said shell, said substantially open end of said shell being adapted for interconnection with said duct assembly, said cylindrical shell including a plurality of air inlet openings for admitting gaseous flow into the interior region of said shell, said air inlet openings being located within a predetermined region of said wall means extending from said substantially open end of said cylindrical shell toward said substantially closed end of said cylindrical shell, said wall means being imperforate within the region defined between said substantially closed end and said region including said air inlet openings; and an annular disc mounted transversely within said interior region of said cylindrical shell, the outer periphery of said annular disc being in contact with the inner surface of said wall means to define a noise suppressing cavity at that end of said cylindrical shell including said fuel injection means, said annular disc being substantially parallel to said closed end of said cylindrical shell and being located within said imperforate region of said wall means, the central opening of said annular disc being in contact with said fuel injection means to impart an annular geometry of said noise suppressing cavity, said annular disc including acoustic coupling means for maintaining said noise suppressing cavity in acoustic communication with the interior region of said cylindrical shell, said noise suppressing cavity and said acoustic coupling means being dimensioned and arranged for minimizing the acoustic impedance presented to a theoretical source of acoustic plane wave energy that is located in a predetermined portion of said interior region of said cylindrical shell so as to direct acoustic energy in a first direction toward said noise suppressing cavity, and in a second direction toward said substantially open end of said cylindrical shell.

5. The low noise burner can of claim 4, wherein said acoustic coupling means includes a plurality of openings perforating said annular disc, said openings being dimensioned and arranged to exhibit an acoustic resistance for minimizing said acoustic impedance of said noise suppressing cavity.

6. The low noise burner can of claim 5, wherein said burner can further comprises a plurality of radially extending plates positioned within said noise suppressing cavity to extend radially from said fuel injection means to the interior surface of said imperforate region of said wall means, said plates extending axially from said substantially closed end of said cylindrical shell to one surface of said annular disc, said radially extending plates being canted relative to said axial center line.

7. The low noise burner can of claim 4, wherein said acoustic coupling means includes a plurality of acoustic horn sections, each of said horn sections of a substantially tubular geometry being symmetric about an axial center line, said plurality of acoustic horn sections being circumferentially disposed in spaced-apart relationship about said annular disc, to extend inwardly into said noise suppressing cavity with said axial center line of said acoustic horn sections being substantially parallel to said axial center line of said substantially cylindrical shell, said annular disc including at least one opening in each portion thereof that is contiguous to the open region of each of said acoustic horn sections for coupling noise energy into said noise suppressing cavity through said acoustic horn sections.

* * * * *

UNITED STATES PATENT AND TRADEMARK OFFICE
CERTIFICATE OF CORRECTION

PATENT NO. : 4,122,674

DATED : October 31, 1978

INVENTOR(S) : Anders O. Andersson et al.

It is certified that error appears in the above-identified patent and that said Letters Patent are hereby corrected as shown below:

Column 7, line 20, "cos $lk_2$" should be —cos $kl_2$—.

Column 8, line 68, "low" should be —high—.

Column 10, line 63, "portion" should be —partition—.

Column 11, line 13, —a— should be inserted after "within" and before "gas".

Signed and Sealed this

Sixth Day of March 1979

[SEAL]

Attest:

RUTH C. MASON
*Attesting Officer*

DONALD W. BANNER
*Commissioner of Patents and Trademarks*